J. F. LANGDON.
HAY GRINDING MACHINE.
APPLICATION FILED MAR. 21, 1908.
909,914.
Patented Jan. 19, 1909.
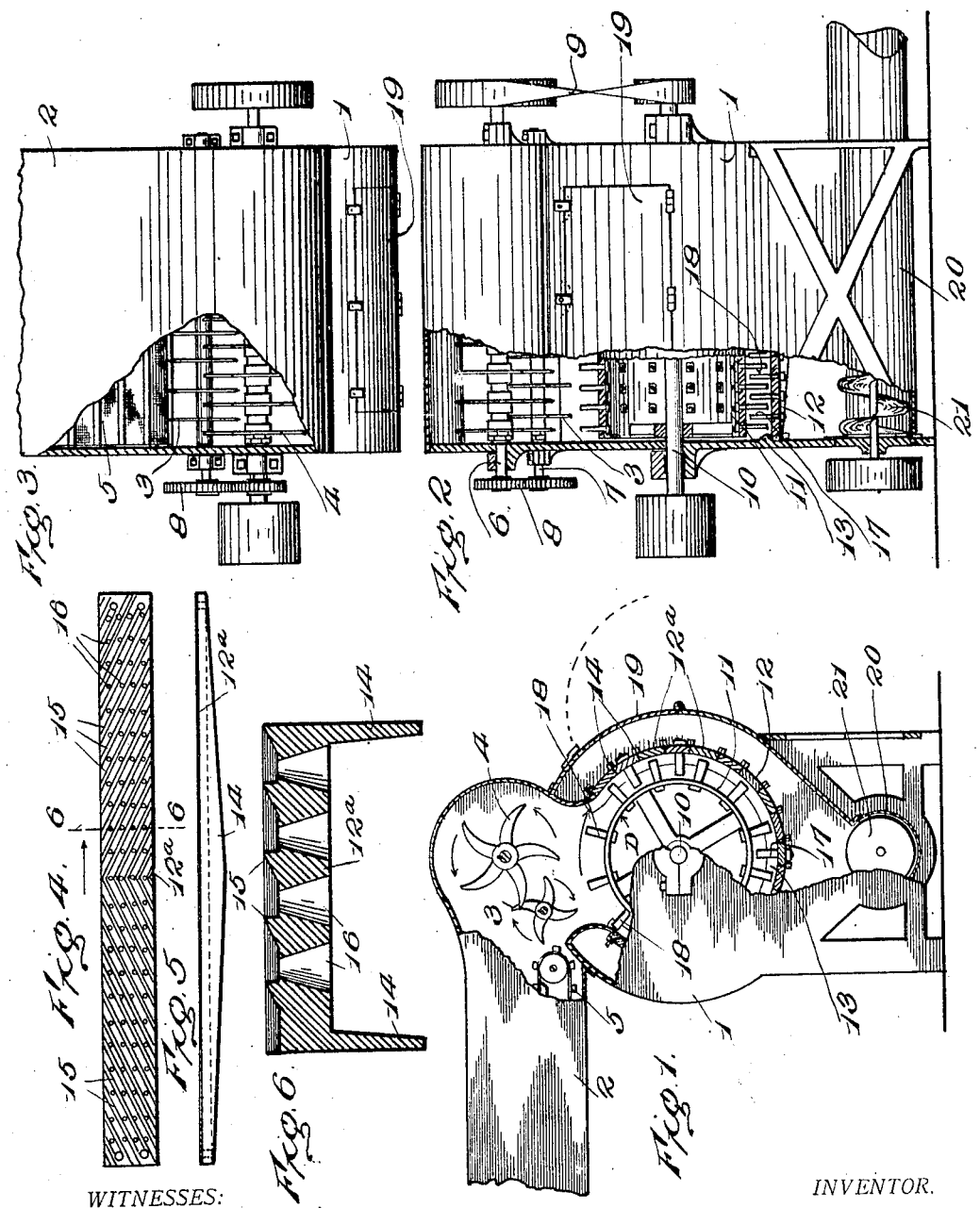
WITNESSES:
INVENTOR.
John F. Langdon
BY
ATTORNEYS.

UNITED STATES PATENT OFFICE.

JOHN F. LANGDON, OF WICHITA, KANSAS.

HAY-GRINDING MACHINE.

No. 909,914.

Specification of Letters Patent.

Patented Jan. 19, 1909.

Application filed March 21, 1908. Serial No. 422,494.

*To all whom it may concern:*

Be it known that I, JOHN F. LANGDON, citizen of the United States, residing at Wichita, in the county of Sedgwick and State of Kansas, have invented certain new and useful Improvements in Hay-Grinding Machines, of which the following is a specification.

The present invention contemplates a novel machine for cutting and grinding all kinds of cured hay and the like, such as timothy, clover, alfalfa or prairie hay.

The object of the invention is to design a simple and inexpensive machine of this character which will operate in an effective manner to produce the desired results and which embodies means for feeding the hay to the cutters and conveying the hay from the machine after passing through the same.
For a full description of the invention and the merits thereof and also to acquire a knowledge of the details of construction and the means for effecting the result, reference is to be had to the following description and accompanying drawings, in which:

Figure 1 is a side elevation of an improved hay cutting and grinding machine embodying the invention, portions being broken away. Fig. 2 is an end view of the same, portions being broken away. Fig. 3 is a top plan view, portions being broken away. Fig. 4 is a plan view of one of the bars of the grinding shell. Fig. 5 is a side view of the same. Fig. 6 is an enlarged transverse sectional view on the line 6—6 of Fig. 4.

Corresponding and like parts are referred to in the following description and indicated in all the views of the drawings by the same reference characters.

Referring to the drawing the numeral 1 designates the casing within which the cutting and grinding mechanism is mounted, the upper portion of the casing communicating with an inlet or feed opening 2 through which the hay is conveyed to the coöperating sets of rotary knives 3 and 4. In the present instance a belt conveyer 5 is shown as mounted within the inlet and serves to feed the hay to the machine. The sets 3 and 4 of rotary cutter knives are keyed upon the shafts 6 and 7 respectively, the shaft 7 being located above and to one side of the shaft 6 and the knives 4 being rotated at a higher speed than the knives 3 so as to coöperate with the latter in an effective manner to cut the hay into small pieces.

As shown on the drawing the shafts 6 and 7 are connected by the gearing 8, and the shaft 6 receives motion through the medium of a belt 9 from a third shaft 10 having the toothed grinding drum 11 mounted thereon. After being operated upon by the rotary knives the hay drops upon the drum 11 and is ground between the same and a shell 12 until it becomes sufficiently fine to pass through openings in the shell.

Specifically describing the construction of the shell which partially surrounds the drum it will be observed that the same is composed of a plurality of longitudinal bars 12ª fitted side by side and having their extremities secured to flanges 13 upon opposite sides of the casing 1. The longitudinal edges of the bars 12ª are formed with the rearwardly extending flanges 14 which serve as stiffening ribs to reinforce the bars and may be utilized if desired in fastening the bars together. The inner face of each of the bars 12ª is provided with the diagonal ribs 15 which are inclined in opposite directions at opposite ends of the bar, the channels between the ribs tending to convey the hay toward the center of the machine as the drum revolves and being in communication with the outlet opening 16 through which the finely ground hay is discharged into the bottom of the casing. It will also be observed that the shell 12 is provided with the inwardly projecting teeth 17 arranged in coöperative relation to the teeth 18 upon the drum 11. With this construction it will be obvious that as the hay is fed into the machine it is first acted upon by the rotary knives 3 and 4 which cut it up into small particles which are dropped upon the rotary drum 11. These particles are then ground between the drum and the shell 12 until they have been reduced to such a degree of fineness as to pass through the outlet openings 16. It may be mentioned here that these openings 16 are flared outwardly so as to prevent choking. The side of the casing 1 is also provided with a door 19 which can be opened as indicated by dotted lines in Fig. 1 should it be desired to examine the grinding drum and shell to ascertain how the machine is operating. After passing through the outlet openings 16 of the shell 12 the finely ground hay may be withdrawn either by suction or by a conveyer of any suitable type, the former being preferable since it operates to withdraw the dust from the drum and shell. In the present instance the finely ground hay discharged from the shell is deposited in a trough 20 at the bottom of the casing and is removed from the trough by means of a screw conveyer 21 mounted therein. It will thus be obvious that after the hay is placed upon the belt conveyer 5 it is fed to the rotary cutting knives and dropped from them upon the drum 11 which coöperates with the shell 12 to grind the hay until it passes through the discharge openings 16, after which it is carried from the casing by means of the conveyer 21.

Having thus described the invention, what is claimed as new is:

1. In a device of the character described, the combination of a casing, cutting knives mounted in the upper portion of the casing, means for feeding the hay to the knives, a grinding drum journaled within the casing below the cutting knives, a shell partially surrounding the drum and coöperating therewith to act upon the hay dropped from the cutting knives, the said shell being provided upon its inner face with ribs and also being provided with openings between the ribs, and means for withdrawing the hay from the casing after it has been acted upon by the drum.

2. In a device of the character described, the combination of a casing provided at opposite sides with inwardly projecting flanges, cutting knives mounted within the casing, means for feeding hay to the cutting knives, a grinding drum journaled within the casing below the cutting knives, a shell coöperating with the grinding drum to act upon the hay dropped from the cutting knives, the said shell being formed of a plurality of bars secured to the before mentioned flanges projecting inwardly from opposite sides of the casing, and means for withdrawing the hay from the casing after being acted upon by the grinding drum.

3. In a device of the character described, the combination of a casing provided at opposite sides with inwardly projecting flanges, cutting knives mounted within the casing, means for feeding hay to the cutting knives, a drum journaled within the casing below the knives, a shell partially surrounding the grinding drum for coöperation therewith to act upon the hay dropped from the cutting knives, the said shell being formed of a plurality of bars connected to the before mentioned flanges and provided upon their inner faces with ribs, and means for withdrawing the hay from the casing after it has been acted upon by the grinding drum.

4. In a device of the character described, the combination of a casing provided with an inlet, a conveyer belt mounted within the inlet, two sets of coöperating knives arranged within the casing for receiving hay from the before mentioned conveyer belt, a grinding drum journaled within the casing below the cutting knives, a shell partially surrounding the grinding drum for coöperation therewith to act upon the hay dropped from the cutting knives, the said shell being composed of a plurality of bars and being provided upon its inner face with ribs, and means for removing from the casing, the hay discharged from the grinding drum and shell.

5. In a device of the character described, the combination of a cutting means, a grinding drum mounted in coöperative relation to the cutting means, and a shell partially surrounding the grinding drum, the said shell being provided with diagonal ribs inclined in opposite directions at the opposite ends thereof so as to have a tendency to move the hay toward the center of the shell, and also being provided between the ribs with discharge openings.

In testimony whereof I affix my signature in presence of two witnesses.

JOHN F. LANGDON. [L. S.]

Witnesses:
J. W. BLOOD,
U. G. CHARLES.